US008935343B2

(12) United States Patent
Flynn et al.

(10) Patent No.: US 8,935,343 B2
(45) Date of Patent: Jan. 13, 2015

(54) INSTANT MESSAGING NETWORK RESOURCE VALIDATION

(75) Inventors: Jeremy Flynn, Dublin (IE); Pukhraj Saxena, Dublin (IE); Radhika Sohoni, Dublin (IE)

(73) Assignee: International Business Machines Corporation, Armonk, NY (US)

( * ) Notice: Subject to any disclaimer, the term of this patent is extended or adjusted under 35 U.S.C. 154(b) by 145 days.

(21) Appl. No.: 13/444,339

(22) Filed: Apr. 11, 2012

(65) Prior Publication Data
US 2012/0296992 A1 Nov. 22, 2012

(51) Int. Cl.
*G06F 15/16* (2006.01)
*H04L 12/58* (2006.01)

(52) U.S. Cl.
CPC .................................... *H04L 12/581* (2013.01)
USPC ......................................................... 709/206

(58) Field of Classification Search
CPC .................................................... H04L 12/581
USPC ......................................... 709/206, 204, 245
See application file for complete search history.

(56) References Cited

U.S. PATENT DOCUMENTS

| | | | |
|---|---|---|---|
| 6,539,421 B1 * | 3/2003 | Appelman et al. | 709/206 |
| 7,548,922 B2 | 6/2009 | Altaf et al. | |
| 7,941,762 B1 * | 5/2011 | Tovino et al. | 715/816 |
| 8,095,602 B1 * | 1/2012 | Orbach | 709/206 |
| 2002/0116528 A1 * | 8/2002 | Vale | 709/245 |
| 2002/0138626 A1 * | 9/2002 | Smith et al. | 709/227 |
| 2003/0014450 A1 | 1/2003 | Hoffman | |
| 2003/0110211 A1 * | 6/2003 | Danon | 709/203 |
| 2005/0114254 A1 * | 5/2005 | Condie | 705/37 |
| 2005/0235034 A1 | 10/2005 | Chen et al. | |
| 2007/0143414 A1 * | 6/2007 | Daigle | 709/206 |
| 2008/0126314 A1 | 5/2008 | Thorn | |
| 2008/0215678 A1 | 9/2008 | Coletrane et al. | |
| 2009/0138937 A1 * | 5/2009 | Erlingsson et al. | 726/1 |
| 2009/0150397 A1 | 6/2009 | Chen et al. | |
| 2009/0164585 A1 * | 6/2009 | Ahlin et al. | 709/206 |
| 2010/0057739 A1 * | 3/2010 | Charka et al. | 707/7 |
| 2010/0325100 A1 * | 12/2010 | Forstall et al. | 707/706 |
| 2011/0010423 A1 * | 1/2011 | Thatcher et al. | 709/206 |
| 2011/0320526 A1 * | 12/2011 | Bhogal et al. | 709/203 |
| 2012/0271805 A1 * | 10/2012 | Holenstein et al. | 707/706 |

FOREIGN PATENT DOCUMENTS

| | | |
|---|---|---|
| GB | 2365150 A | 2/2002 |
| WO | 2008086224 A2 | 7/2008 |

* cited by examiner

*Primary Examiner* — Kostas Katsikis
(74) *Attorney, Agent, or Firm* — Patents on Demand P.A.; Brian K. Buchheit; Scott M. Garret

(57) ABSTRACT

A character string can be received. A determination can be made of whether the received character string includes or is a request for a network resource. When it is determined that the received character string comprises a request for a network resource, an identical network resource address can be determined from a browser history of a web browser. The identical network resource address can be communicated to an instant messaging client application.

25 Claims, 4 Drawing Sheets

INSTANT MESSAGING NETWORK RESOURCE VALIDATION

CROSS-REFERENCE TO RELATED APPLICATIONS

This application claims priority to the European Patent Application Serial No. 11166194.8 entitled "REALTIME TRACKING OF SOFTWARE COMPONENTS", filed May 16, 2011.

BACKGROUND

The present invention relates to the technical field of instant messaging, and more specifically, to the validation of character strings entered by a user of an instant messaging application.

Instant messaging is a type of communication between computer users which allows a user on one computer to engage in a conversation with one or more other users on other computers in real time via a computer network such as the Internet. Communication is controlled by instant messaging server software to which participating computer users connect. The server maintains address details of participating computers and connects a first user with one or more further users when a conversation is initiated by entry of recipient identification details such as a name.

Each participating computer comprises instant messaging client software for providing a user interface window including a text entry pane, into which the user types the text for sharing with the other participating users in the conversation. The user interface window also includes a chat session pane, in which is displayed the text entered by all users participating in the chat session. Instant messaging is generally a more informal and spontaneous exchange medium than other means such as electronic mail, and inaccuracies of spelling and punctuation are generally accepted. However, there are some character strings which must be typed with total accuracy. For example, a user may enter a Uniform Resource Identifier (URI), which can be described as a string of characters used to identify an address or resource on a network such as the Internet. More particularly, a user may enter a Uniform Resource Locator (URL), which is type of URI used to denote an address of, for example, an Internet web page.

BRIEF SUMMARY

Embodiments of the disclosure are for a method, device, apparatus, computer program product, and computer system for validating a character string received by an instant messaging client application. In the disclosure, a character string can be received. A determination can be made of whether the received character string includes or is a request for a network resource. When it is determined that the received character string comprises a request for a network resource, an identical network resource address can be determined from a browser history of a web browser. The identical network resource address can be communicated to an instant messaging client application.

DETAILED DESCRIPTION

Figure 1:
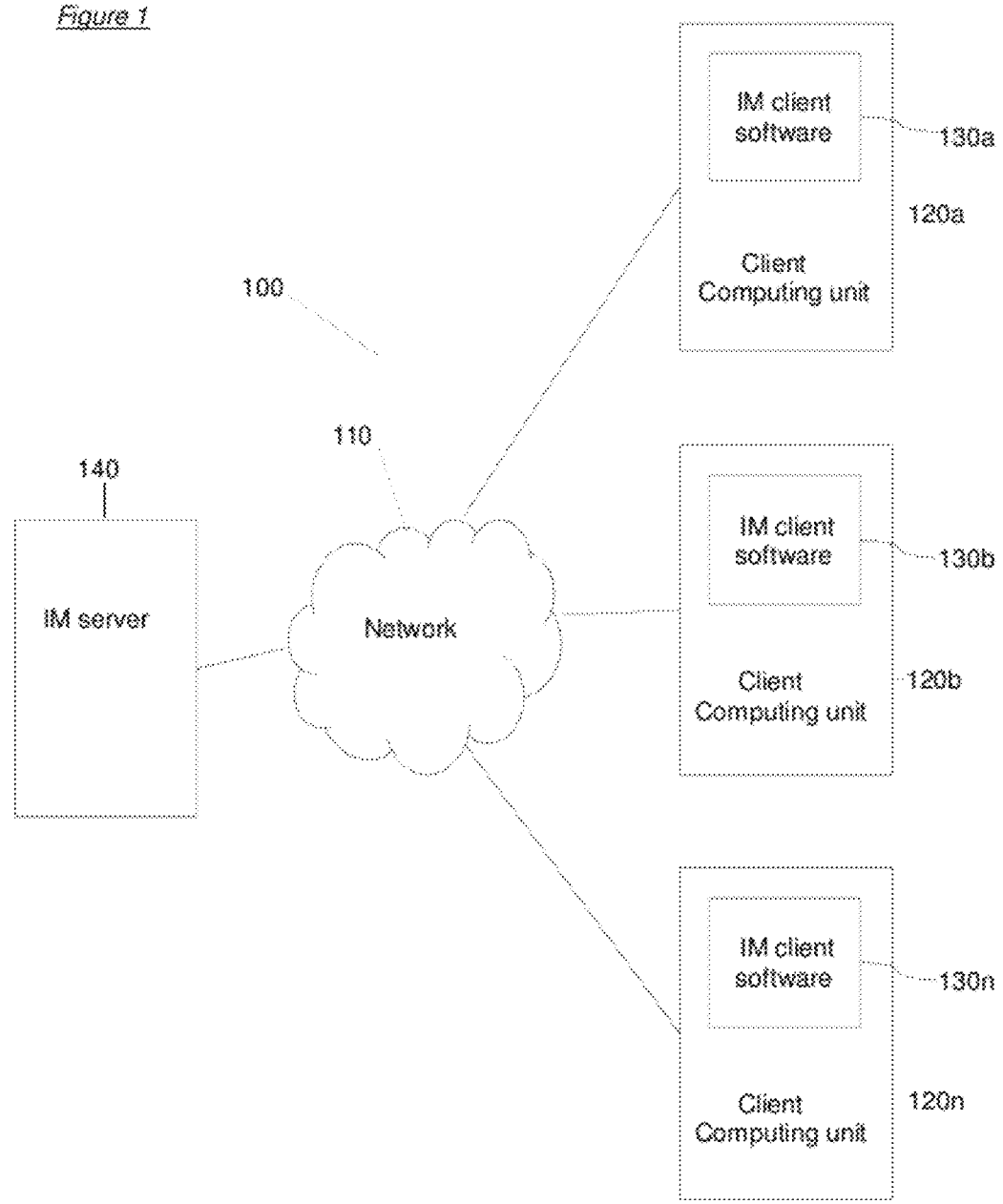
FIG. 1 is a block diagram illustrating a data processing system in accordance with an embodiment of the present invention.

In the disclosure, the term network resource address will be used to apply to a Uniform Resource Identifier (URI), a Uniform Resource Locator (URL), or to any other reference to a unique resource. Any mistake in the typing of the network resource address or in the copying from another location, however slight, will render the identified resource inaccessible. For example, an incorrectly typed or copied URL will not allow the desired web page to be obtained. It would be desirable to provide means to ensure that a character string, representing for example a network resource address, may be typed correctly within the text entry pane of an instant messaging client application window.

Known prior art references fail to address (e.g., see information disclosure statement) the problem of how to ensure the correct entry of text, such as a network resource address, into the text entry pane of an instant messaging application. The disclosure includes various aspects that overcome shortcomings of known prior art.

One aspect of the disclosure is for a method for validating a character string received by an instant messaging client application. Embodiments of the disclosure communicate the network resource addresses to an instant messaging client application. An advantage provided by this communication is that it provides a method for validating an entered address against addresses in a web browser history.

In one embodiment, the identical network resource address can be received and displayed in a window of the instant messaging client application for selection by a user. Thus, the embodiment provides that the address may be entered as it has appeared in a web browser.

In one embodiment, the determined address for a network resource can be compared with a list of previously visited web page addresses stored in the web browser history. Thus, the embodiment provides that the addresses of previously visited web pages may be presumed to be valid addresses.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring to the figures, FIG. 1 is an overview of a typical system incorporating an embodiment of the present invention. In the system 100, a network 110, for example a communications network such as the Internet, provides the communication medium for an instant messaging application. An example of an instant messaging application is IBM Lotus Sametime®. A plurality of client computing units 120a, 120b-120n each comprise instant messaging (IM) application client software 130a, 130b-130n. Client computing units may comprise desktop personal computers, laptop computers, handheld computers, or any data processing devices capable of running instant messaging client software. The instant messaging application client software is in communication, via network 110, with an instant messaging application server 140. An instant messaging chat session is initiated by a participating user of one of the client computing units 120a, 120b-120n, for example 120a, by entering data identifying the address of the client computing unit of at least one other user, for example 120b. The entered data is used by instant messaging application server 140 to connect the users in a shared chat session which appears within the chat session pane of the instant messaging client software window on the client computing units 120a, 120b-120n of each participating user.

Figure 2:
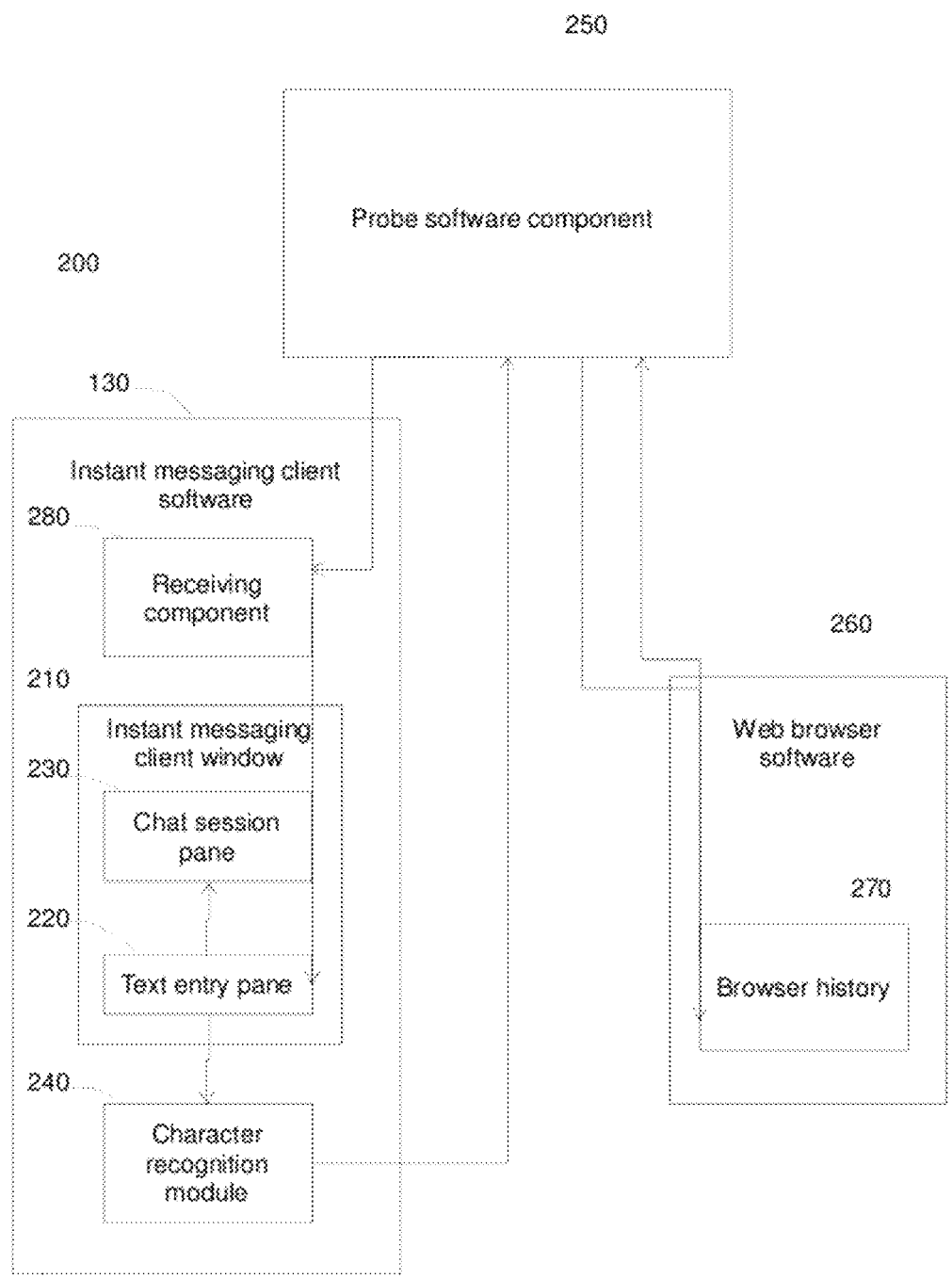
FIG. 2 is a diagrammatic representation of a client system in accordance with an embodiment of the present invention.

In accordance with an embodiment of the invention, FIG. 2 is a block diagram detailing components of an instant messaging system 200, operating within system 100 as illustrated in FIG. 1. The instant messaging client software 130 comprises an instant messaging client window 210 comprising a text entry pane 220 within which the user enters instant messaging text for communication to other participating users in the chat session, and a chat session pane 230 within which communicated text appears once transmitted to a recipient. Instant messaging client software 130 also comprises a character recognition module 240. The character recognition module 240 is software code which comprises a lexical analysis function which analyses text as it is entered to identify particular character strings. These character strings are defined by rules embodied in the lexical analysis function and which, for example, alone or when contained within longer character strings, denote references to network resource addresses. For example, such character strings may take the form of an 'http' reference, an 'https' reference, a 'www' reference, a 'w3' reference, or any other character string which indicates that the entered character string is a network resource address reference. In one embodiment, the character recognition module 240 comprises a configurable function, wherein a user or administrator may define additional character strings which indicate a network resource address.

On identification by character recognition module 240 of such a character string which indicates a network resource address, it is saved by character recognition module 240. This saved character string will hereafter be termed a 'string element'. The string element is passed to probe software component 250. In one embodiment, probe software component 250 is separated from instant messaging client software 130 and resides on the instant messaging server 140 of the system 100 in FIG. 1 within which is operating instant messaging system 200. However, a person skilled in the art will realize that probe software component 250 may form part of instant messaging client software 130, or may reside elsewhere on a client computing unit 120, on another server, or other location within system 100. Probe software component 250 is operable to send messages to web browser software 260. Examples of web browser software are Mozilla Firefox®, Microsoft Internet Explorer®, and Google Chrome®.

In one embodiment, web browser software 260 resides on the same client computing unit as instant messaging client software 130. Web browser software 260 maintains a record of the network resource addresses and identifying descriptions of all resources visited on the Internet or other network such as a corporate Intranet, for example, the URLs and identifying descriptions of web pages. These are stored in a file or data structure referred to as the browser history 270. Web browser software 260 has a set of public application programming interfaces (APIs) which allow the web browser software 270 to be addressed by other software. Amongst these APIs is the browser history API. On receipt of the saved element passed to it by character recognition module 240, probe software component 250 makes a call to the browser history API of web browser software 260 which retrieves from browser history 270 and returns a list of all the network resource addresses in browser history 270 to probe software component 250.

Probe software component 250 contains lexical analysis logic which compares character strings, or string elements, received from the character recognition module 240 of instant messaging client software 130 with the list of network resource addresses received from browser history 270 of web browser software 260. A list of matched network resource addresses, optionally together with any descriptions in the form of metadata associated with entries in browser history 270, is saved by probe software component 250. This saved list is then passed by probe software component 250 to a receiving component 280 of instant messaging client software 130. Receiving component 280 passes the saved list to instant messaging client window 210 for presentation to the user. This presentation may be in any convenient way, for example by a drop-down list below the cursor position in the text entry pane 220. The user may then select from the list a desired network resource address which is then entered into the text entry pane 220.

In an alternative embodiment, probe software component 250 may retrieve entries from browser history 270 by calling browser history APIs of web browser software 260 on a client computing unit 120 different from that containing the instant messaging client software 130. In a further alternative embodiment, a plurality of calls may be made to browser history APIs of a plurality of web browsers 270 on the same or different client computing units 120, for example all those having instant messaging software participating in the chat session.

Figure 3:
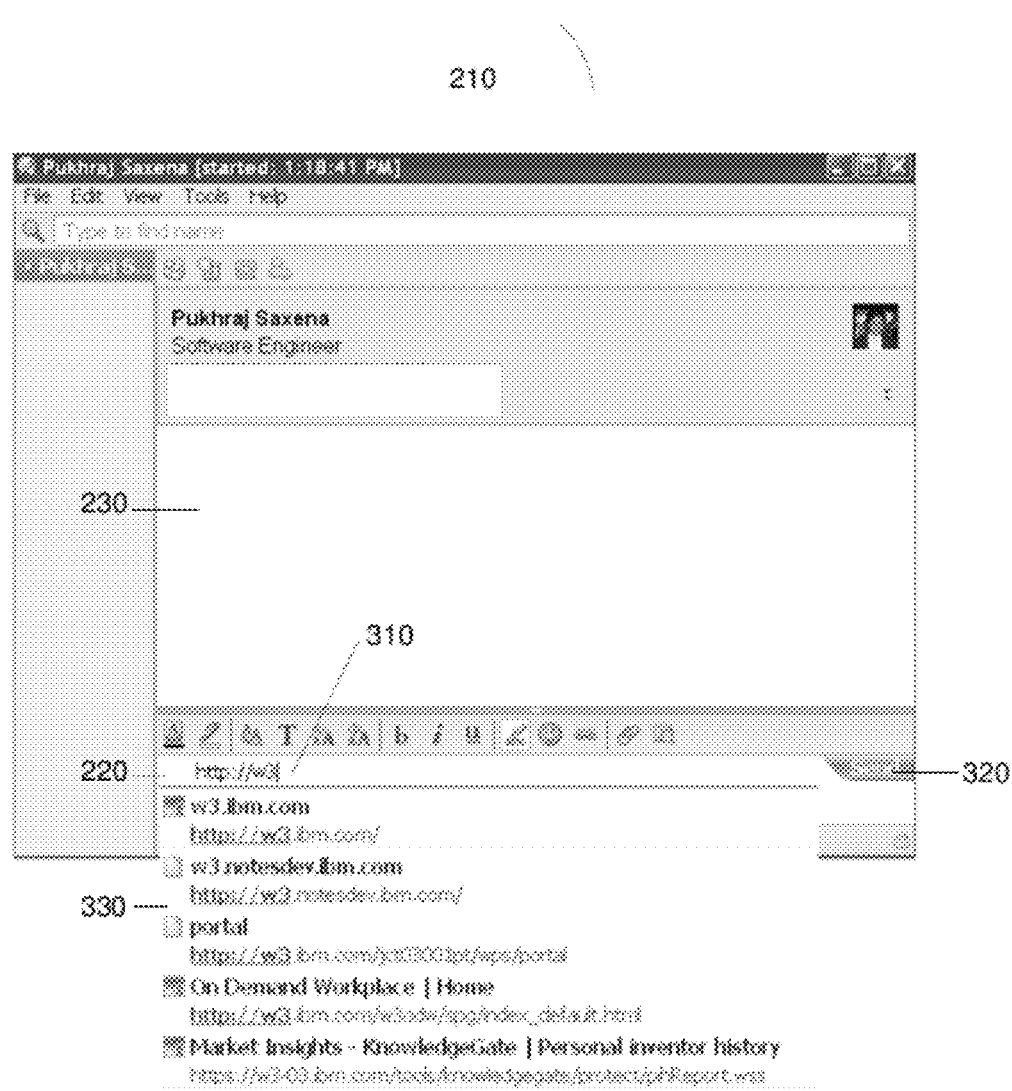
FIG. 3 is a screenshot of an instant messaging client window, in accordance with an embodiment of the present invention.

With reference to the system illustrated in FIG. 2, FIG. 3 is a screenshot showing an embodiment of the present invention as it is presented to the user on a graphical user interface. Instant messaging client software 130 has instant messaging client window 210 comprising a text entry pane 220, within which a user types input text 310, and chat session pane 230 within which text entered by all users participating in the chat session is displayed. Send button 320 is selected to send text 310 entered in the text entry pane 220 to all users participating in the chat session, and is displayed in chat session pane 320. As shown in FIG. 3, the user has entered input text 310 'http://w3' which has been determined by lexical analysis function of character recognition module 240 as representing a network resource address. Network resource addresses containing this character string are presented to the user as a drop down list 330. If the user sees the address required in the list 330, it may be selected using a mouse to click send button 320, or by using corresponding keyboard functions to produce the same selecting effect. On selection action, the selected address is caused to be entered in full into text entry pane 220, and transferred to other users when the user selects the send function as above, when it appears in the chat session pane 230.

Figure 4:
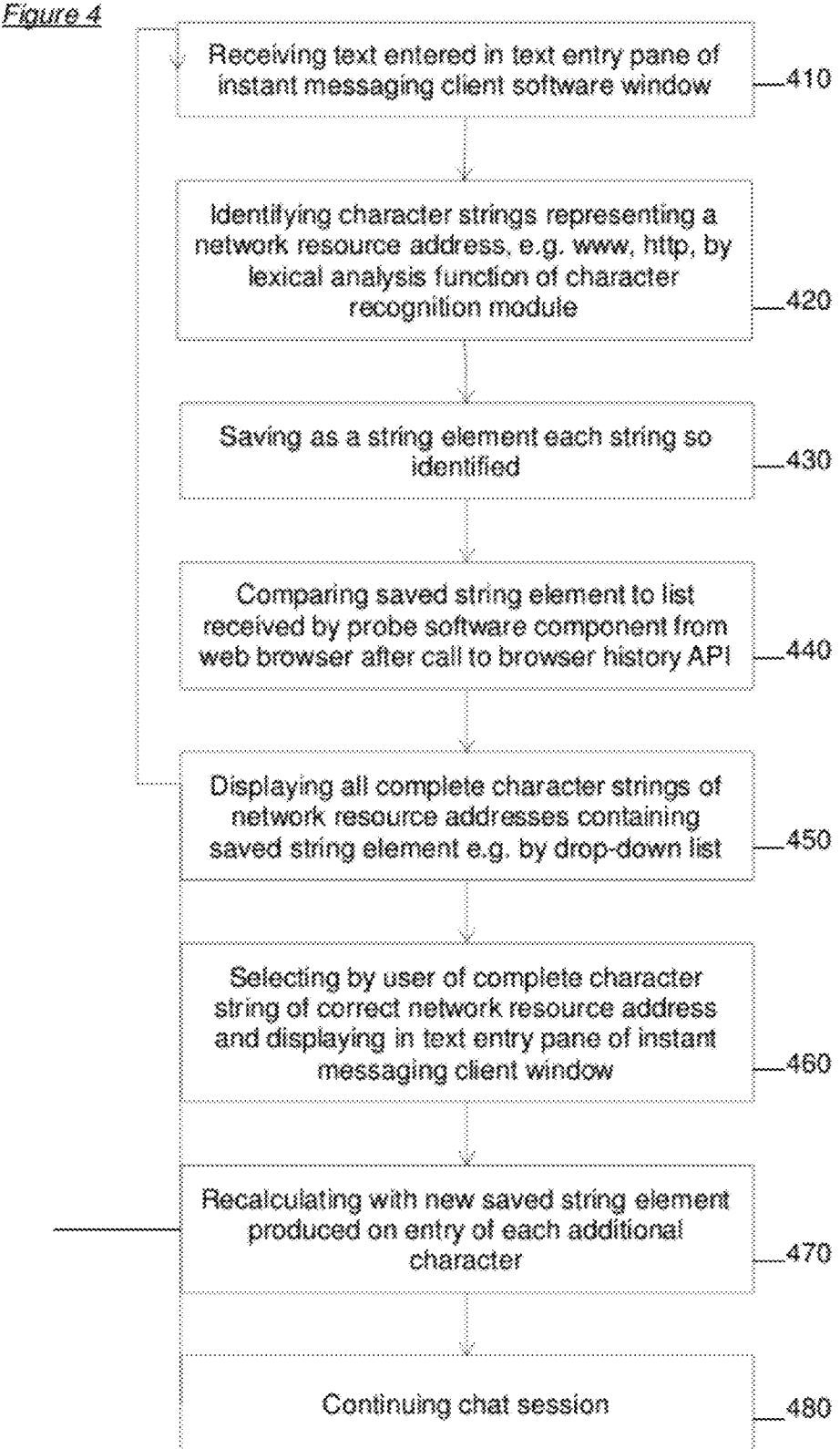
FIG. 4 is a flowchart showing an overview of an embodiment of the method of the invention.

FIG. 4 is a flow diagram illustrating the operation of an embodiment of the invention as described above with reference to FIG. 2, and as presented to the user as described above with reference to FIG. 3. Text is entered by a user in text entry pane 220 in receiving step 410. In identifying step 420, text is processed by character recognition module 240, and an entry representing a network resource address is identified as defined by rules in the lexical analysis function of character recognition module 240 defining character strings which are contained within network resource addresses, for example www, http.

In saving step 430, each so identified entered string representing a network resource address or partial network resource address, is saved as a string element. In comparing step 440, the saved string element is passed to probe software component 250. Probe software component 250 has received a list of network resource addresses, for example URLs from visited web sites, from browser history 270 after calling browser history API of web browser software 260. Using its lexical analysis function, probe software component 250 compares the string element with the list, and identifies network resource addresses in the list which contain the string element.

In displaying step 450, a list of all complete character strings of network resource addresses, for example URLs, which contain the string element, so identified by probe software component 250 is passed to receiving component 280 of instant messaging client software 130. It is then passed by receiving component 280 to instant messaging client window 210, and displayed, optionally with any descriptive information, in a convenient manner. This may be, for example, as a drop-down list 330 below text entry pane 220 of instant messaging client software window 210. In selecting step 460, the user selects any entry from drop-down list 330 representing, for example, a desired URL, which on selection action by the user is displayed within text entry pane 220 of instant messaging client window 210.

In recalculating step 470, the user, instead of selecting immediately from presented network resource addresses, for example as drop-down list 330, enters an additional character. This restarts the process at step 410, with the new string one character longer, and a new element saved at step 430. A new comparing step 440 will produce a new list of network resource addresses containing the saved string element, probably of shorter length because of the increased character string length of the string element. It may be that a user enters a string which produces a saved string element which produces no identical character strings at comparing step 440, in which case a null list will be passed by probe software component 250 to instant messaging client software 130, and nothing will be presented to the user in instant messaging client software window 210. When the user selects a network resource address from, for example, drop-down list 330 and it is entered into text entry pane 220, the chat session continues, step 480.

The flowchart and block diagrams in the Figures illustrate the architecture, functionality, and operation of possible implementations of systems, methods and computer program products according to various embodiments of the invention.

In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the invention has been described with reference to one or more specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method comprising:
   responsive to receiving a character string from an instant messaging client, determining if the received character string comprises a request for a network resource;
   responsive to determining that the received character string comprises a request for a network resource:
   comparing the received character string with a list of previously visited network resource addresses, from browser history; and
   identifying a substantially identical network resource address from a list of previously visited network resource addresses that comprise the string; and
   communicating the substantially identical network resource address to the instant messaging client application; and
   storing, by web browser software, records of network resource addresses in said browser history and identifying descriptions of all resources visited using a set of application programming interfaces (APIs) which allow the web browser software to be addressed by other software.

2. The method of claim 1, further comprising:
   receiving the substantially identical network resource address and displaying the substantially identical network resource address in a window of the instant messaging client application for selecting by a user.

3. The method of claim 1, further comprising:
   identifying a string element of the determined address for the network resource and determining from the browser history of the web browser a plurality of addresses for a network resource that comprise the identified string element; and
   displaying in a window of the instant messaging client application the plurality of addresses for a network resource comprising the identified string element for selection of one of the displayed addresses for a network resource by a user.

4. The method of claim 3, wherein the string element of the determined address for a network resource identifies an http or https reference.

5. The method of claim 3 further comprising:
   comparing the determined address for a network resource with a list of previously visited web page addresses stored in the web browser history.

6. The method of claim 1, wherein the determining if the received character string comprises the request, the determining of the substantially identical network resource address, and the communicating of the substantially identical network resource address are performed by at least one computing device having at least one processor executing program instructions stored in one or more storage devices.

7. An apparatus comprising:
   a processor coupled to a memory;
   a character recognition program for, responsive to receiving a character string from an instant messaging client, determining if the received character string comprises a request for a network resource;
   a probe software program for, responsive to determining that the received character string comprises a request for a network resource:
   comparing the received character string with a list of previously visited network resource addresses, from browser history; and
   identifying a substantially identical network resource address from a list of previously visited network resource addresses that comprise the string; and
   a software program for communicating the determined substantially identical network resource address to the instant messaging client application; and
   storing, by web browser software, records of network resource addresses in said browser history and identifying descriptions of all resources visited using a set of application programming interfaces (APIs) which allow the web browser software to be addressed by other software.

8. The apparatus of claim 7, further comprising: a receiving program for receiving the identical network resource address and for displaying the identical network resource address in a window of the instant messaging client application for selecting by a user.

9. The apparatus of claim 7, further comprising:
   a character recognition program for identifying a string element of the determined address for the network resource and a probe software program for determining from the browser history of the web browser a plurality of addresses for a network resource that comprise the identified string element.

10. The apparatus of claim 9, further comprising:
    a receiving program for displaying in a window of the instant messaging client application the plurality of addresses for a network resource comprising the identified string element for selection of one of the displayed addresses for a network resource by a user.

11. The apparatus of claim 10, wherein the string element of the determined address for a network resource identifies an http or https reference.

12. The apparatus of claim 7, further comprising:
    a program for comparing the determined address for a network resource with a list of previously visited web page addresses stored in the web browser history.

13. The apparatus of claim 7, wherein the character recognition program, the probe software program for determining the identical network resource address, and said software program for communicating comprise program instructions able to be executed by a processor, said program instructions being stored in one or more storage mediums.

14. The apparatus of claim 7, further comprising:
one or more computer-readable storage mediums storing program instructions of the character recognition program, for the probe software program for determining the identical network resource address, and for the software program.

15. A computer program product comprising:
one or more computer-readable storage devices;
program instructions, stored on at least one of the one or more storage devices, to, responsive to receiving a character string from an instant messaging client, determine if the received character string comprises a request for a network resource;
program instructions, stored on at least one of the one or more storage devices, to, responsive to a determination that the received character string comprises a request for a network resource:
compare the received character string with a list of previously visited network resource addresses, from browser history; and
dentify a substantially identical network resource address from a list of previously visited network resource addresses that comprise the string;
program instructions, stored on at least one of the one or more storage devices, to, communicate the substantially identical network resource address to the instant messaging client application; and
storing, by web browser software, records of network resource addresses in said browser history and identifying descriptions of all resources visited using a set of application programming interfaces (APIs) which allow the web browser software to be addressed by other software.

16. The computer program product of claim 15, further comprising:
program instructions, stored on at least one of the one or more storage devices, to, receive the identical network resource address and display the identical network resource address in a window of the instant messaging client application for selecting by a user.

17. The computer program product of claim 15, further comprising:
program instructions, stored on at least one of the one or more storage devices, to, identify a string element of the determined address for the network resource and determining from the browser history of the web browser a plurality of addresses for a network resource that comprise the identified string element.

18. The computer program product of claim 17, further comprising:
program instructions, stored on at least one of the one or more storage devices, to, display in a window of the instant messaging client application the plurality of addresses for a network resource comprising the identified string element for selection of one of the displayed addresses for a network resource by a user.

19. The computer program product of claim 18, wherein the string element of the determined address for a network resource identifies an http or https reference.

20. The computer program product of claim 18, further comprising:
program instructions, stored on at least one of the one or more storage devices, to, compare the determined address for a network resource with a list of previously visited web page addresses stored in the web browser history.

21. A computer system comprising:
one or more processors, one or more computer-readable memories and one or more computer-readable, tangible storage devices;
program instructions, stored on at least one of the one or more storage devices for execution by at least one of the one or more processors via at least one of the one or more memories, to, responsive to receiving a character string from an instant messaging client, determine if the received character string comprises a request for a network resource;
program instructions, stored on at least one of the one or more storage devices for execution by at least one of the one or more processors via at least one of the one or more memories, to, responsive to determining that the received character string comprises a request for a network resource:
compare the received character string with a list of previously visited network resource addresses, from browser history; and
identify a substantially identical network resource address from a list of previously visited network resource addresses that comprise the string;
program instructions, stored on at least one of the one or more storage devices for execution by at least one of the one or more processors via at least one of the one or more memories, to communicate the substantially identical network resource address to an instant messaging client application; and
storing, by web browser software, records of network resource addresses in said browser history and identifying descriptions of all resources visited using a set of application programming interfaces (APIs) which allow the web browser software to be addressed by other software.

22. The computer system of claim 21, further comprising:
program instructions, stored on at least one of the one or more storage devices for execution by at least one of the one or more processors via at least one of the one or more memories, to receive the identical network resource address and displaying the identical network resource address in a window of the instant messaging client application for selecting by a user.

23. The computer system of claim 21, further comprising:
program instructions, stored on at least one of the one or more storage devices for execution by at least one of the one or more processors via at least one of the one or more memories, to identify a string element of the determined address for the network resource and determining from the browser history of the web browser a plurality of addresses for a network resource that comprise the identified string element; and
program instructions, stored on at least one of the one or more storage devices for execution by at least one of the one or more processors via at least one of the one or more memories, to display in a window of the instant messaging client application the plurality of addresses for a network resource comprising the identified string element for selection of one of the displayed addresses for a network resource by a user.

24. The computer system of claim 23, wherein the string element of the determined address for a network resource identifies an http or https reference.

25. The computer system of claim 23 further comprising:
program instructions, stored on at least one of the one or more storage devices for execution by at least one of the one or more processors via at least one of the one or more memories, to compare the determined address for a network resource with a list of previously visited web page addresses stored in the web browser history.

* * * * *